W. J. GARDNER.
AGRICULTURAL TRACTION IMPLEMENT.
APPLICATION FILED MAR. 9, 1912.

1,059,140.

Patented Apr. 15, 1913.

2 SHEETS—SHEET 1.

Inventor
William J. Gardner,

Witnesses
J. H. Crawford.

By Victor J. Evans
Attorney

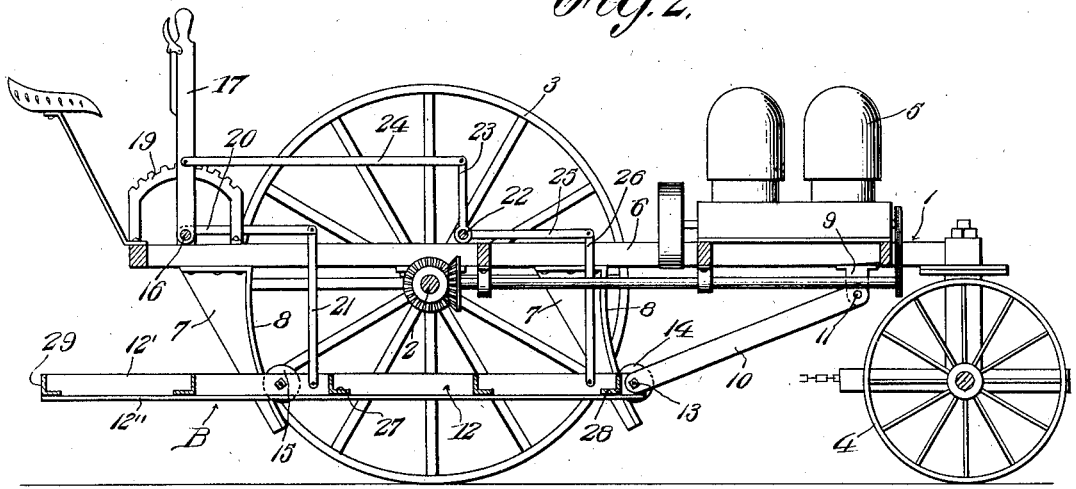
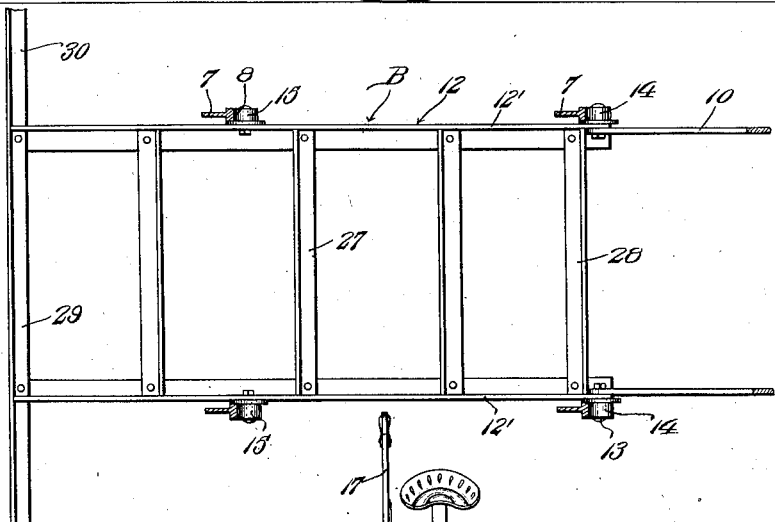
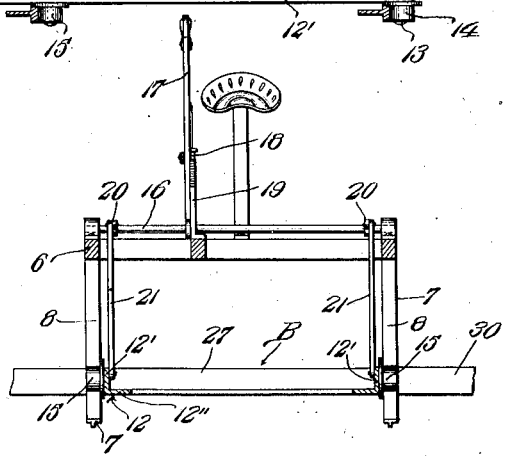

UNITED STATES PATENT OFFICE.

WILLIAM J. GARDNER, OF LINDSAY, CALIFORNIA.

AGRICULTURAL TRACTION IMPLEMENT.

1,059,140.   Specification of Letters Patent.   Patented Apr. 15, 1913.

Application filed March 9, 1912. Serial No. 682,660.

*To all whom it may concern:*

Be it known that I, WILLIAM J. GARDNER, a citizen of the United States, residing at Lindsay, in the county of Tulare and State of California, have invented new and useful Improvements in Agricultural Traction Implements, of which the following is a specification.

This invention relates to agricultural implements adapted to be operated by power, such as a traction engine.

The invention, which is applicable to plows, cultivators, disk and other harrows and to various other implements of different types, has for its special object to provide a simple and improved construction whereby an implement may be associated with the frame of a traction engine in such a manner that it may be conveniently and efficiently actuated, and in such a manner that the implement may be conveniently raised or lowered to engage the soil at the proper depth.

A further object of the invention is to provide a frame or cage associated with the frame of the traction engine and vertically adjustable with reference thereto, said frame or cage affording supporting means for implements of various kinds and types.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

Figure 1:
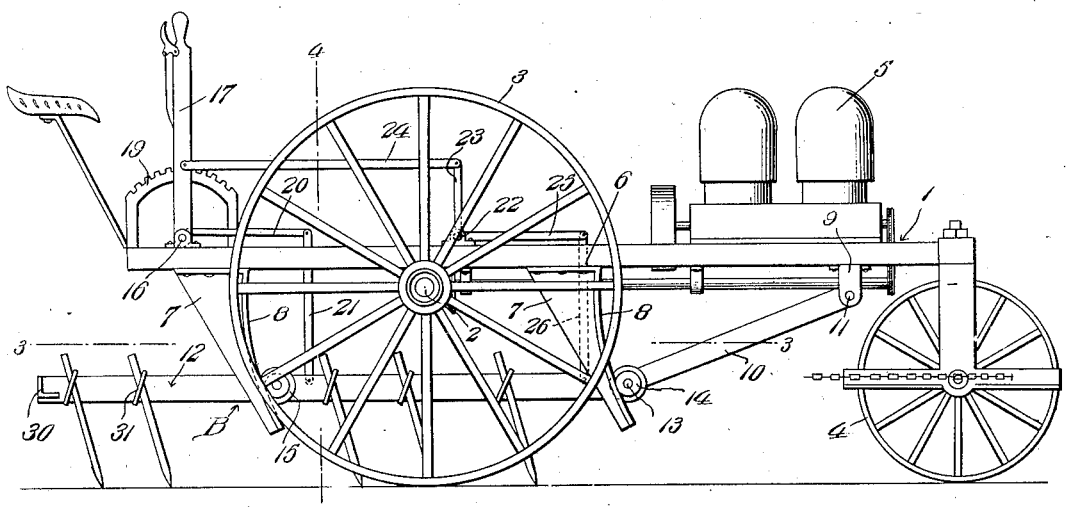
Figure 5:
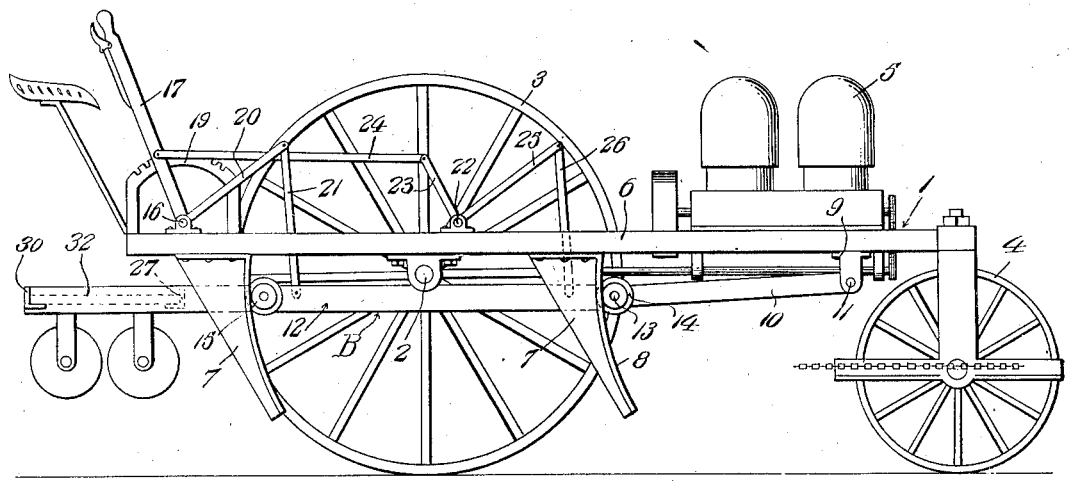

In the drawings,—Figure 1 is a side elevation showing a traction engine equipped with the adjustable frame or cage of the present invention, showing also cultivator teeth associated with the cage. Fig. 2 is a longitudinal vertical sectional view. Fig. 3 is a horizontal sectional view taken on the line 3—3 in Fig. 1. Fig. 4 is a transverse sectional view taken on the line 4—4 in Fig. 1. Fig. 5 is a side elevation of the machine showing the tool carrying frame or cage in a raised position, and showing a disk harrow associated therewith.

Corresponding parts in the several figures are denoted by like characters of reference.
The traction engine employed in connection with my invention may be of any suitable and preferred form and type. It is preferred, however, to use a type of traction engine having three wheels, namely, two supporting wheels and one guide wheel, because an engine of this type is easily guided and is capable of making short turns and is, therefore, particularly available for use in and about orchards and other places where crops are to be cultivated and where trees and other obstructions are found which must be avoided.

Referring to the drawings, 1 designates the frame of the traction engine which is supported on an axle 2 having transporting wheels 3, 3, said frame being also provided with a suitably mounted guiding wheel 4. The motor, which may be of any preferred type, is conventionally indicated at 5. Any suitable well known means may be employed for transmitting motion to the traction wheels, and any desired steering device may be employed for manipulating the steering wheel or guide wheel 4.
The frame 1, which is supported upon and above the axle of the traction wheels, and which is, therefore, sufficiently elevated above the ground for the purpose of this invention, includes side members 6 which are provided with downwardly extending brackets 7, two such brackets being preferably mounted at each side of the frame. The brackets 7 have arcuate front faces 8. The side members of the frame are provided a suitable distance in advance of the front brackets 7 with supporting brackets 9 upon which links 10 are supported by means of pivot members 11 with relation to which the arcuate faces of the front brackets 7 are concentric. The links 10 are pivotally connected with the front ends of the side members of a cage or frame B, the side members 12 of said cage being connected with the links 10 by pivots 13 carrying flanged wheels or rollers 14 that engage and ride upon the arcuate faces of the front brackets 7. The side members 12 of the frame or cage B are also provided with flanged wheels or rollers 15 adapted to ride upon the arcuate faces of the rear brackets 7 which form inclined tracks over which the cage B moves. For the purpose of effecting vertical adjustment of the frame or cage a rock shaft 16 supported on the frame 1 of the traction engine is provided with a hand lever 17 having a stop member 18 engaging a suitably supported segment rack 19. The rock shaft 16 is provided with arms 20 connected by links 21 with the side members 12 of the frame or cage B. A second rock shaft 22 is provided with an upwardly extending arm 23 which is connected by a link 24 with the lever 17. The rock shaft 22 is also provided with arms 25 which are connected by links 26 with the side members 12 of the cage B. It will be seen that by actuating the lever 17 the cage B may thus be raised or lowered while maintaining a substantially horizontal position, and in substantially parallel relation to the main frame, said cage being caused to ride over the curved and inclined front and rear tracks or brackets on which it is held by the action of the links 10, and the said frame or cage being supported at any desired elevation by the stop member 18 engaging the rack 19.

The frame or cage B is composed of the side members 12 which consists of L-shaped angle or channel bars of iron or steel, said angle or channel bars being connected together at suitable intervals by cross bars 27 and at the front and rear ends by front and rear cross bars 28, 29 which are likewise made of angle iron or steel, the parts being bolted together or otherwise connected to make a strong and durable structure. The rear cross bar 29 is made of sufficient length to extend materially beyond the side members 12, forming extension arms or brackets 30 which may be utilized for carrying tools or cultivator teeth, as may be required. The vertical flanges 12' of the angle bars constituting the side members 12 extend upwardly from the outer edges of the horizontal flanges 12" of said side members. The cross bars, as well as the side members of the frame or cage, may be utilized to support earth engaging tools of various descriptions which may be mounted upon said cross bars and side members by clamping means of any suitable description, as indicated at 31. The horizontal flanges 12" also constitute supporting ledges upon which may be supported the frames of various agricultural implements, such, for instance, as a disk harrow which is shown in Fig. 5 of the drawings, the harrow frame, which is indicated at 32, being supported upon the flanges or ledges 12" where it may be secured in any convenient manner.

It will be seen from the foregoing description, taken in connection with the drawings hereto annexed, that earth engaging implements of almost any type or kind, such as plows, cultivators, disk or spring tooth harrows, land rollers, clod crushers or the like may be associated with or mounted upon the frame or cage B. Said frame or cage, together with the implement carried thereby, may be easily and quickly adjusted vertically to place the implements into or out of engaging position with reference to the ground and in position to engage the ground at the desired depth. When the machine advances the strain is not altogether on the brackets 7, but is usually taken up by the links 10 which connect the carrying frame or cage with the brackets 9 of the tractor frame. On the other hand, the brackets 7 will guide the carrier frame and virtually support the same in position for operation, the strain on the supporting links which connect the frame with the arms of the rock shafts being reduced to a minimum.

The general construction is simple and inexpensive, and the essential parts of the device, that is to say, the bracket members 7, the carrying frame or cage B, the links and brackets 10 and 9 and the adjusting means for the cage or frame may be applied to many types of tractors now in use without materially changing the same or interfering with the use of such tractors for other purposes. It is particularly to be understood that no limitation whatever is made to the use in connection with this invention of any particular form or type of tractor. A traction implement constructed in accordance with my invention while useful for general agricultural purposes will be found useful and desirable in orchards where crops are to be cultivated, and where a traction engine may be guided far more safely and with less danger of injury to the trees than an implement drawn by a team.

Having thus described the invention, what is claimed as new, is:—

1. A main frame having supporting wheels and downwardly extending front and rear brackets forming inclined tracks, an approximately horizontal tool carrying frame supported for movement along said front and rear tracks in approximately parallel relation to the main frame, and means for raising and lowering the tool carrying frame relatively to the main frame.

2. A main frame having supporting wheels and downwardly extending front and rear brackets forming tracks of arcuate shape, a tool carrying frame having wheels engaging the tracks, means for raising and lowering the tool carrying frame relatively to the main frame, a bracket on the main frame, and a link pivoted on the bracket in concentric relation to the arcuate tracks, said link being also connected with the tool carrying frame.

3. In a traction implement, a wheel supported tractor frame having downwardly extending front and rear brackets forming guide tracks, a tool carrying frame having wheels riding on said tracks, and draft links connecting the tool carrying frame with the tractor frame in advance of the front brackets.

4. In a traction implement, a wheel supported tractor frame having downwardly extending front and rear brackets with arcuate front faces, a tool carrying frame having guide wheels riding on the brackets, draft links connecting the tool carrying frame with the tractor in advance of the front brackets, said draft links being pivoted concentrically with the arcuate faces of the brackets, and means for effecting vertical adjustment of the tool carrying frame and for supporting the same in adjusted position.

5. In a traction implement, a tractor frame having side members, front and rear brackets mounted in pairs on said side members and having arcuate front faces, a tool carrying cage having flanged wheels guided on said brackets, draft links connecting the cage with the tractor frame in advance of the front brackets, rock shafts supported on the tractor frame and having radially extending arms, links connecting the arms of the rock shafts with the tool carrying cage, and means for simultaneously actuating the rock shafts to effect vertical adjustment of the cage.

In testimony whereof I affix my signature in presence of two witnesses.

WILLIAM J. GARDNER.

Witnesses:
   Z. E. PAGE,
   OLLIE JOHNSON.